US012475102B2

(12) United States Patent
Choudhary et al.

(10) Patent No.: US 12,475,102 B2
(45) Date of Patent: Nov. 18, 2025

(54) METHODS AND SYSTEMS FOR CONFLICT DETECTION AND MITIGATION BETWEEN SERVICES IN AN AUTONOMOUS DATABASE CLOUD ENVIRONMENT

(71) Applicant: Oracle International Corporation, Redwood Shores, CA (US)

(72) Inventors: Dungara Ram Choudhary, Fremont, CA (US); Yu Kin Ho, Fremont, CA (US); Wilson Wai Shun Chan, San Mateo, CA (US); Chandrajith Ramachandran Unnithan, Union City, CA (US); Walter Battistella, Sunnyvale, CA (US); Tak Fung Wang, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 10 days.

(21) Appl. No.: 18/601,396

(22) Filed: Mar. 11, 2024

(65) Prior Publication Data
US 2025/0094407 A1    Mar. 20, 2025

Related U.S. Application Data

(60) Provisional application No. 63/538,443, filed on Sep. 14, 2023.

(51) Int. Cl.
*G06F 16/23* (2019.01)
*G06F 16/27* (2019.01)

(52) U.S. Cl.
CPC ...... *G06F 16/2365* (2019.01); *G06F 16/2343* (2019.01); *G06F 16/27* (2019.01)

(58) Field of Classification Search
CPC ... G06F 16/2365; G06F 16/27; G06F 16/2343
(Continued)

(56) References Cited

U.S. PATENT DOCUMENTS 6,272,491 B1    8/2001    Chan et al.
6,529,906 B1    3/2003    Chan
(Continued)

OTHER PUBLICATIONS

Torres et al., "Identifying Sessions to Websites as an Aggregation of Related Flows", dated 2012, 15th International Telecommunications Network Strategy and Planning Symposium dated 2012, 6 pages.
(Continued)

Primary Examiner — Robert W Beausoliel, Jr.
Assistant Examiner — Lauren Zannah Ganger
(74) Attorney, Agent, or Firm — Hickman Becker Bingham Ledesma LLP; Stephen J. Walder, Jr.

(57) ABSTRACT

Techniques are provided for determining access affinity between services in a database cluster, and for placing workload of those services based, at least in part, on the access affinity. The techniques involve generating access records that indicate when sessions that are associated with each service operate on data blocks that were accessed by another session that is associated with another service. Access affinity information is generated based on the access records, where the access affinity information indicates access affinity (e.g. conflict scores) between each pair of services. The cluster then selects which node is to perform the work of a given session based on the access affinity information and the service associated with the session.

21 Claims, 3 Drawing Sheets

(58) Field of Classification Search
USPC .......................................................... 707/691
See application file for complete search history.

(56) References Cited

U.S. PATENT DOCUMENTS

| | | | |
|---|---|---|---|
| 7,039,669 | B1 | 5/2006 | Wong et al. |
| 7,080,075 | B1 | 7/2006 | Chan et al. |
| 7,379,952 | B2 | 5/2008 | Chan et al. |
| 7,389,293 | B2 | 6/2008 | Chan et al. |
| 7,984,073 | B1 | 7/2011 | Basiago |
| 8,391,295 | B2 | 3/2013 | Colrain |
| 8,560,690 | B2 | 10/2013 | Chandrasekaran |
| 9,692,820 | B2 | 6/2017 | Chaudhary |
| 10,001,983 | B2 | 6/2018 | Roy |
| 10,853,253 | B2 | 12/2020 | Choudhary |
| 11,494,397 | B1 * | 11/2022 | Sharma ............... G06F 16/2386 |
| 11,630,838 | B1 * | 4/2023 | Gujral ................. G06F 16/9024 707/625 |
| 2006/0143178 | A1 | 6/2006 | Chan et al. |
| 2013/0339550 | A1 | 12/2013 | Rangaraman |
| 2016/0019253 | A1 | 1/2016 | Chan et al. |
| 2019/0102408 | A1 * | 4/2019 | Loaiza ................. G06F 16/2471 |

OTHER PUBLICATIONS

S. M. Blott et al., "User-level Billing and Accounting in IP Networks", in Bell Labs Technical Journal, vol. 4, No. 4, dated Oct.-Dec. 1999. 15 pages.

Patterson, R. H. 'Informed Prefetching and Caching.' Proceedings of the Fifteenth ACM Symposium on Operating Systems Principles Copper Mountain, Colorado, USA: ACM. (1995) 17 pages.

Oracle® Automatic Storage Management, "Administrator's Guide", 12c Release 1 (12.1), dated May 2015, 620 pages.

Weld, U.S. Appl. No. 15/592,050, filed May 10, 2017, Notice of Allowance, May 22, 2019.

Choudhary, U.S. Appl. No. 15/252,076, filed Aug. 30, 2016, Notice of Allowance, Jul. 17, 2020.

Choudhary, U.S. Appl. No. 15/252,076, filed Aug. 30, 2016, Office Action, Sep. 18, 2019.

Choudhary, U.S. Appl. No. 15/252,076, filed Aug. 30, 2016, Office Action, Jun. 15, 2018.

Choudhary, U.S. Appl. No. 15/252,076, filed Aug. 30, 2016, Notice of Allowance, Mar. 18, 2020.

Choudhary, U.S. Appl. No. 15/252,076, filed Aug. 30, 2016, Final Office Action, Jan. 9, 2019.

* cited by examiner

METHODS AND SYSTEMS FOR CONFLICT DETECTION AND MITIGATION BETWEEN SERVICES IN AN AUTONOMOUS DATABASE CLOUD ENVIRONMENT

CROSS-REFERENCE TO RELATED APPLICATIONS; BENEFIT CLAIM

This application claims the benefit of Provisional Application 63/538,443, filed Sep. 14, 2023, the entire contents of which is hereby incorporated by reference as if fully set forth herein, under 35 U.S.C. § 119 (e).

FIELD OF THE INVENTION

The present disclosure relates to database cloud environments and, more specifically, to techniques for detecting and mitigating conflicts between services in autonomous database cloud environments.

BACKGROUND

Database services are logical abstractions for managing workloads in database systems. Each service represents a workload with common attributes, service-level thresholds, and/or priorities. The grouping is based on attributes of work, which might include:
  the application function to be used,
  the priority of execution for the application function,
  the job class to be managed, and/or
  the data range used in the application function or job class.

Thus, services divide database workload into disjoint groups based on data accesses or functionality. For example, a particular "Business Suite" may define a service for each responsibility, such as general ledger, accounts receivable, order entry, and so on.

Each database (or pluggable database) could have one or more services defined. A database cloud service (DBaaS) may serve millions of databases, and therefore millions of database services may be active at a time. These services access multiple database resources including data blocks as part of SQL execution.

There is only one current copy of a particular data block in a cloud cluster. If services accessing the current copy of the same data block are located on different nodes, then the copy is transferred over network between these nodes. Making such inter-node transfers incurs significantly more overhead than would be incurred if both services were on the same node, and therefore could locally access the copy without any inter-node transfer.

Further, each data block has a corresponding master node. The master node of a data block is the node that executes the lock manager that coordinates accesses and modifications to the data block. If the node that is running the service that is requesting access to a particular block is different than the master node of the block, then the requesting node needs to communicate with the corresponding master node over the network to get required permissions. Such inter-node lock-related traffic is significantly reduced when the services that are requesting access to a data block are running on the master node for the data block.

Further, lock permissions can be cached by the nodes in a cluster. If a data block is accessed and modified from the same node by different services, then it can cache lock permissions after first request and grant subsequent permission requests without incurring inter-node lock-related messaging.

Based on the foregoing, to reduce the number of inter-node transfers of "current" data blocks, and to reduce inter-node communication with master nodes, it is desirable to provision all of the following on the same node:
  the workload of all services that frequently access a particular set of data blocks, and
  the lock manager for that particular set of blocks The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described hereafter for capturing access statistics by different services in a database cloud environment, and using this information to optimize workload-to-node placement in a database cloud. Specifically, the workload-to-node placement techniques described herein involve monitoring resource accesses by services, and using collected information to automate provisioning to mitigate contention. In addition, techniques are provided for using the collected access information to detect if a service could be scaled out without causing intra-service data contention, or should be scaled in when intra-service data contention occurs.

The techniques automatically provision, on the same node or set of nodes, the workloads of services that access a common set of data blocks, thereby reducing:
  inter-node transmission of current data blocks, and
  inter-node transmission of lock requests Because the provisioning is done automatically based on access statistics, it can be repeated periodically to dynamically change workload-to-node placements in response to changes in access statistics. The automatic provisioning techniques minimize or avoid manual configuration operations that are inefficient in large cloud environments.

System Overview

Figure 1:
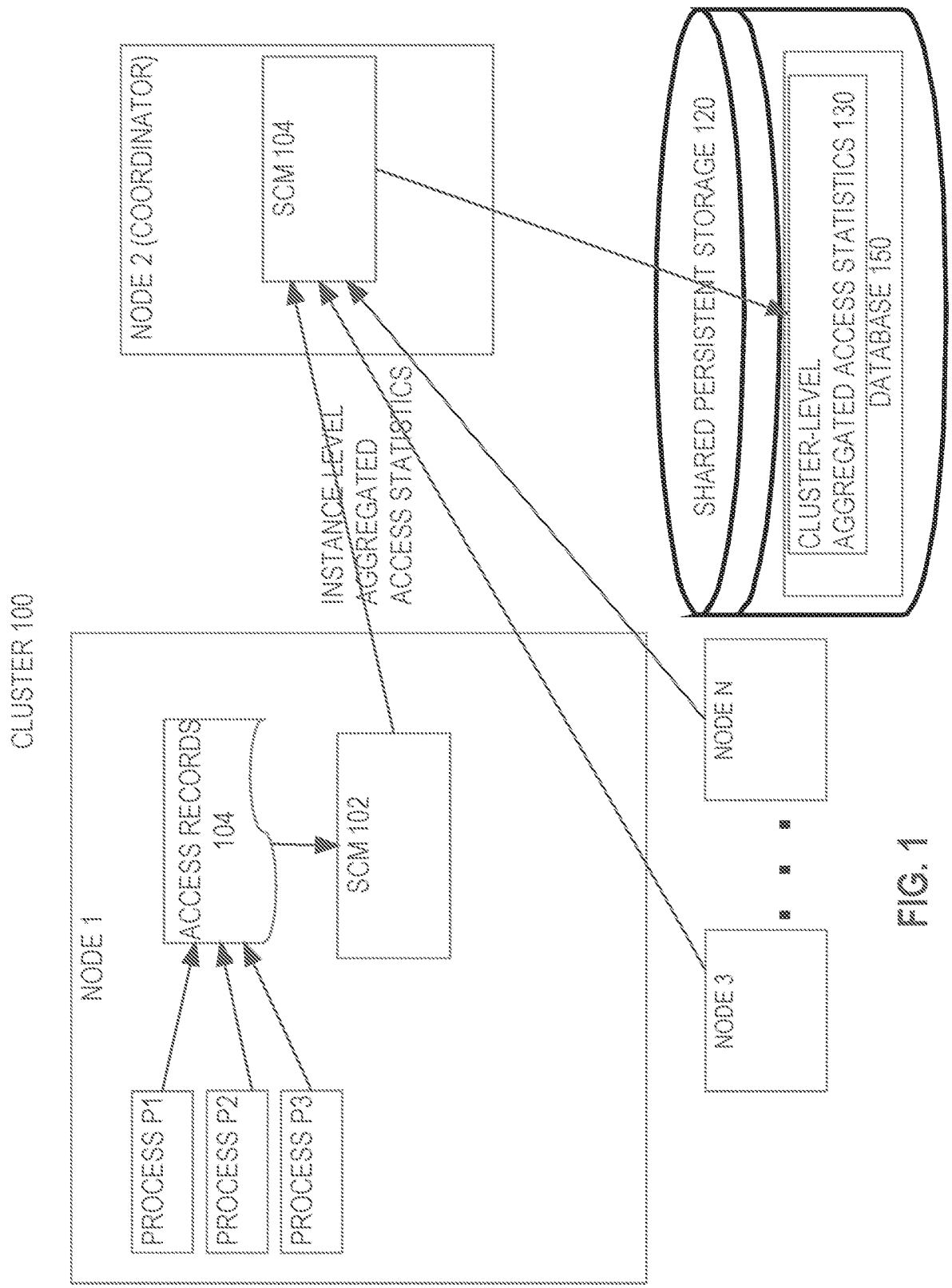
FIG. 1 is a block diagram of a cluster that includes components for generating access affinity information based on inter-service access interactions, according to an implementation.

FIG. 1 is a block diagram of a cluster 100 that includes components for performing workload-to-node placement based on access patterns of services, according to one implementation. Referring to FIG. 1, cluster 100 includes nodes 1-N. Each node of cluster 100 includes one or more processors and memory, and is executing one or more instances of a database server. All nodes have access to shared persistent storage 120.

Shared persistent storage 120 generally represents persistent storage that is accessible to all nodes of cluster 120. Shared persistent storage 120 may include any number and type of storage devices, and the techniques described herein are not limited to any particular type of storage devices. Shared persistent storage 120 stores a database 150 to which the database server instances on nodes 1-N have shared access.

Each node executes processes that perform the workload of the cluster. In the illustrated example, node 1 is executing processes P1-P3. Each process is associated with a service, and performs a portion of the workload of the corresponding service. As a process performs its workload, access records 104 are generated based on the data blocks accessed during performance of the workload.

As shall be explained in greater detail hereafter, these access records are used to determine the "access affinity" of the service associated with the process to other services. As used herein, "access affinity" refers to the degree to which a service accesses the same data blocks as another service. Services that access the same data blocks will have high access affinity to each other, while services that have little overlap in the data blocks they access will have low access affinity to each other.

Each of nodes 1-N execute a Statistics Collection and Management process (SCM). The SCM is responsible for collecting and aggregating the access records 104 generated by local processes. The aggregated records produced by the SCMs are referred to herein as "instance-level aggregated access statistics". In the illustrated example, node 1 includes SCM 102, and node 2 includes SCM 104. SCM 102 collects and aggregates access records 104 from processes P1-P3 on node 1. SCM 104 collects and aggregates access records from processes (not shown) on node 2. Nodes 3-N also include SCMs (not shown).

In one implementation, one node in the cluster is designated as the "coordinator node". The SCM on the coordinator node has the additional responsibility of collecting and aggregating the instance-level aggregated access statistics to produce cluster-level aggregated access statistics 130. In the illustrated example, node 2 is designated to be the coordinator node, so SCM 104 collects the instance-level aggregated access statistics and generates the cluster-level aggregated access statistics 130. The cluster-level aggregated statistics 130 are stored on the persistent shared storage 120 and made available to workload-to-node assignment modules (not shown) so that workload may be assigned to nodes based, at least in part, on the access affinity of the services that are associated with the workloads.

The Service-to-Node Mapping

Any given service may be running on a subset of the nodes within a cluster. For example, one service (e.g. general ledger) may be running on nodes 1, 2 and 5 of cluster 100, another service (e.g. accounts receivable) may be running on nodes 1, 3 and 7 of cluster 100, while yet another service (e.g. order entry) is running on all nodes 1-N of cluster 100. As illustrated by this scenario, the service-to-node mapping may be many-to-many. That is, a service may be active on more than one node in the cloud, and a single node can have many services running locally.

The set of nodes that are running a service are referred to herein as the "candidate node set" for the service. During the workload-to-node assignment process, the workload associated with a given service is assigned to a node selected from among its candidate node set. Thus, the techniques described hereafter involve selecting, from among the nodes that are in the candidate node set of a service, a node for handling a particular request for the service based, at least in part, on the access affinity of that service to other services.

Access Records

When a client sends a request to a service to perform an operation, the request is directed to a node (the "target node") that belongs to the candidate node set of the service, and executed by a process (the "target process") in that node. For the purpose of explanation, it shall be assumed that, for a particular session of service X, the target node is node 1, and the target process is process P1.

During execution of the request, process P1 may perform operations that involve accessing database objects (e.g. tables, indexes, etc.) stored in database 150. The operations may insert, update, or delete data items from the database objects, or may simply read data items that belong to the database objects. Since all data in database 150 are ultimately stored in data blocks, those operations involve reading and/or writing specific data blocks.

As explained above, the techniques described herein involve making workload-to-node assignments based on access affinity between services. Access records 104 are generated to record the information needed to determine the degree of affinity between services. In particular, the access records 104 indicate, for each data block accessed by a process that is performing the workload of a service:

data block metadata indicating the address of the accessed data block the identity of the service that is accessing the data block (the "current-accessing service")

the identity of another service that accessed the same data block (the "prior-accessing service")

an interaction-type identifier which indicates the nature of the interaction between the current-accessing service and the prior-accessing service an inter-node conflict flag that indicates whether the interaction was inter-node (between processes executing on different nodes) or local (between processes executing on the same node)

Thus, assume that process P1 requests to write to a data block B1 that has been updated by process P2 and on which process P2 currently holds an exclusive lock. Assume further that process P2 is associated with service Y. In this scenario, an access record may be generated to indicate:

data block metadata=B1 current-accessing service=service X prior-accessing service=service Y interaction-type identifier=write/write conflict inter-node conflict flag=false In one implementation write/write conflicts are merely one type of interaction that is recorded in the access records. Other types of interactions that are recorded in the access records may include, but are not limited to:

read/write conflicts read/read interactions (where both processes hold non-conflicting read locks on the same data block)

recent-update interactions

"Recent-update interactions" are interactions where the prior-accessing service updated the block, but released its lock on the data block before the current-accessing service requested its lock on the data block. Thus, no lock conflict occurs. However, the access history of the data block (which in some database implementations may be read from the data block itself) indicates that the data block was recently updated by the prior-accessing service.

Aggregating the Access Statistics

As illustrated in FIG. 1, the access records 104 generated for the processes executing in a node are sent to the SCM process (e.g. SCM 102) that is executing in that node. The SCM process divides time in fixed length intervals, and aggregates all of the access records it receives in each interval to produce instance-level aggregated access statistics. At the end of each interval, each SCM process sends the instance-level aggregated access statistics to the coordinator node (e.g. node 2). The SCM 104 on the coordinator node 2 aggregates the instance-level aggregated access statistics to create cluster-level aggregated access statistics 130. The coordinator node 2 stores cluster-level aggregated access statistics 130 on shared persistent storage 120.

In one implementation, the coordinator node 2 aggregates access conflicts for each service pair to each database object. For example, assume that database 150 includes four database objects A, B, C, D, and that cluster 100 is executing four database services S1, S2, S3 and S4. Under these circumstances, the cluster-level aggregated access statistics 130 may indicate, for object A:

| SERVICE PAIR | CONFLICT SCORE |
| --- | --- |
| S1/S2 | 50 |
| S1/S3 | 10 |
| S1/S4 | 5 |
| S2/S3 | 5 |
| S2/S4 | 20 |
| S3/S4 | 70 |

The cluster-level aggregated access statistics 130 may have similar information for each of the four database objects A, B, C and D.

For a given database object, the "conflict score" associated with a given service pair may simply be a count of the number of access records that (a) include the service pair, and (b) correspond to data blocks of the given database object. Alternatively, the conflict scores may reflect different weights for access records of different interaction-types. For example, in one implementation, an inter-node write/write conflict between S1 and S2 would be given more weight in determining the S1/S2 conflict score than a local read/read interaction between S1 and S2, since an inter-node write/write conflict results in a greater performance penalty.

Making Workload-to-Node Assignments Based on the Cluster-Level Aggregated Access Statistics Once cluster-level aggregated access statistics 130 have been generated, the coordinator node (e.g. node 2) identifies the services with access conflicts (with "high access affinity") by analyzing the collected statistics, and provisions the workload of such services close to each other. Specifically, access affinity of a given service to other services is one factor used to determine where to provision workloads of the service. Other factors used in the workload-to-node assignment may include things such as the already-existing placement of services, the scalability of the service, the workload balance of the nodes in the cluster, etc.

For example, all other factors being equal, a request associated with service S1 may be sent to a node executing a workload associated with service S2 based on the service pair S1/S2 having a high access affinity. However, if the node executing the workload associated with service S2 is overloaded, the workload associated with service S1 may instead by sent to a node that is executing a workload associated with service S3, where the conflict score of S1/S3 is high, but lower than that of S1/S2.

Various clustering algorithms may be used to partition the services into "connection groups" based, at least in part, on the cluster-level aggregated access statistics 130. Connection groups shall be described in greater detail hereafter.

Access-Affinity-Based Connection Routing

Figure 2:
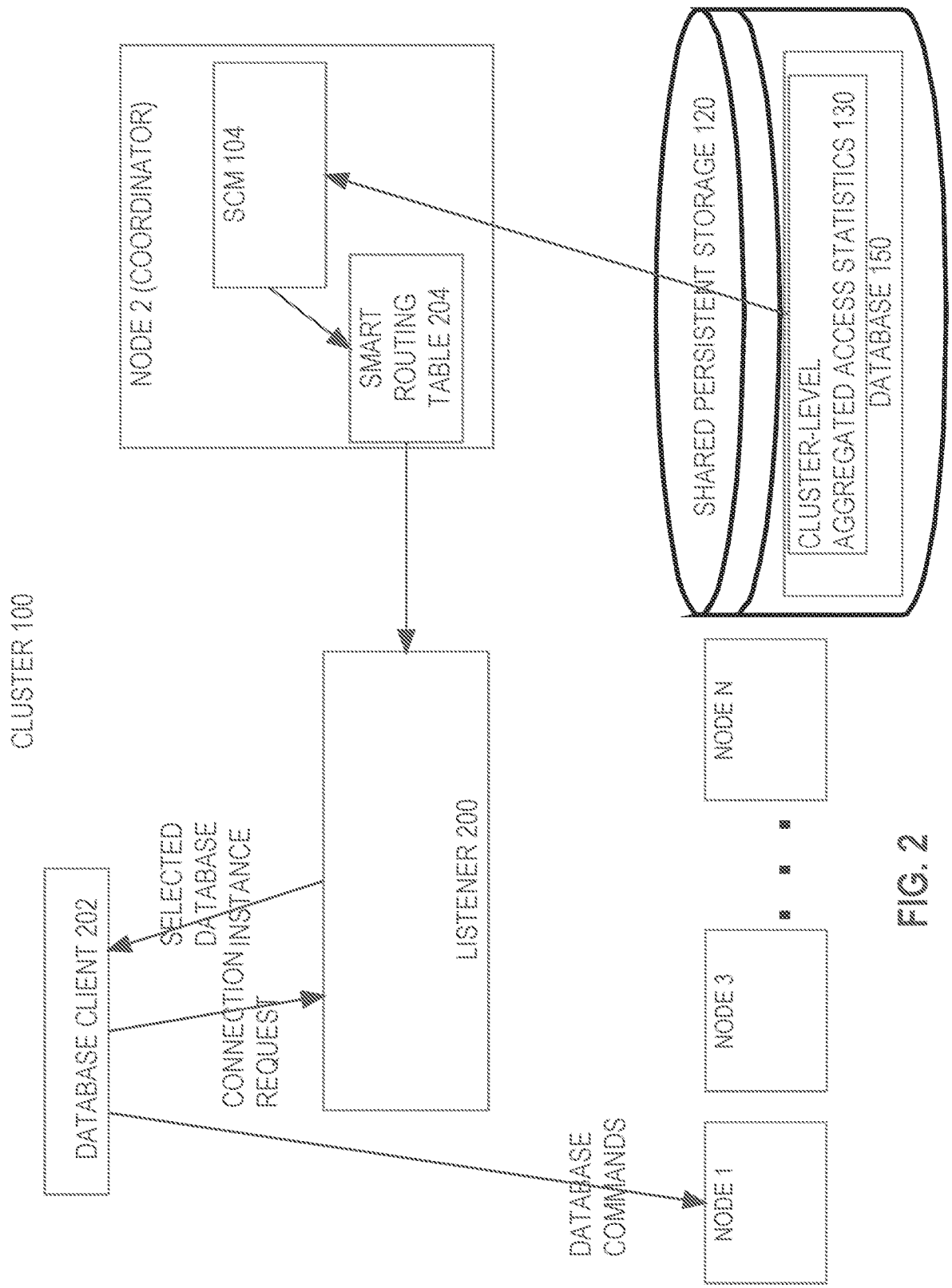
FIG. 2 is a block diagram of a cluster that includes components for assigning sessions to nodes based on a smart routing table generated based on the access affinity information.
Figure 3:
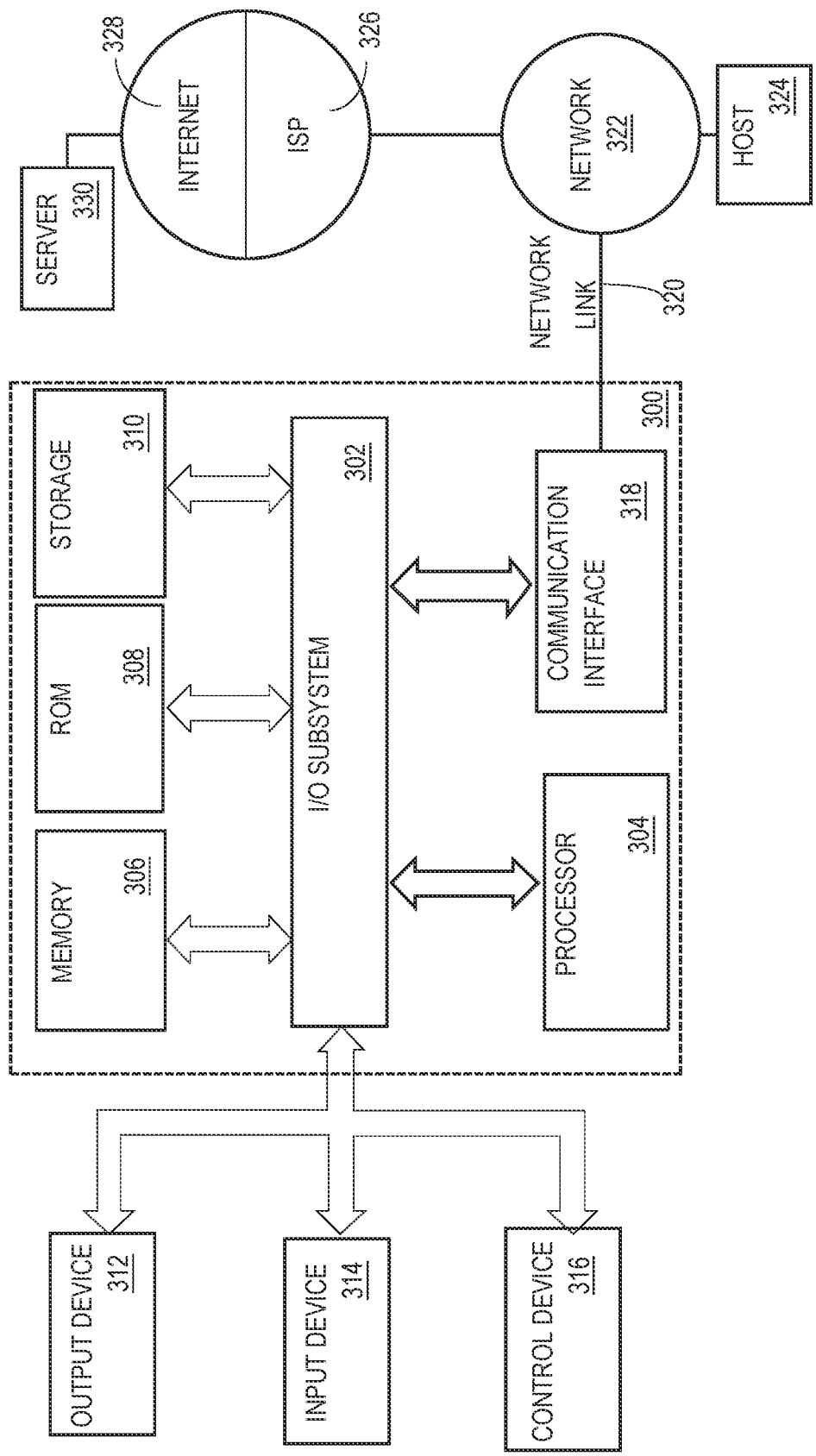
FIG. 3 is a block diagram of a computer system upon which the techniques described herein may be implemented.

As mentioned above, cluster-level aggregated access statistics 130 are used to assign (or reassign) session placement to the ideal set of minimal nodes to reduce conflicts and contention. For example, if the cluster-level aggregated access statistics 130 indicates that service S1 and service S3 frequently access the blocks of a particular database object X, then sessions associated with service S1 and sessions associated with service S3 may be assigned to the same node (e.g. node 1). Node 1 may also be assigned to be the lock master for the rows of object X. Because most accesses to the blocks of object X (whether by service S1 or service S3) will be requested by node 1:
- the accesses will not require inter-node shipping of the current versions of the blocks, and
- the lock requests that are made to access the blocks will not require inter-node communication In one implementation, making the workload-to-node assignment includes generating a "smart routing table" based on (a) the current configuration of the cluster (e.g. which nodes are currently executing which workloads), and (b) access affinity between service pairs (as indicated by the cluster-level aggregated access statistics 130). FIG. 2 is a block diagram of cluster 100 illustrating the components involved in the workload-to-node assignment.

Once services are grouped into service sets, various techniques may be used to assign each service set to particular nodes/instances. In one implementation, the workload establishes resource requirements for each service, and the service set size is determined to account for current resource requirements of the services that form part of each connection group. If a connection group has higher workload, then the connection group is assigned a larger service set. The attributes considered when selecting nodes for a service set may include, for example:

Current placement: To minimize session movement a node that has higher number of active sessions for the services that are part of a connection group, is preferred over any other node.

Load Balancing: The system disperses connection groups such that the load is balanced across nodes in a cluster and when selecting a node, the algorithm picks an unassigned node compared to an assigned node.

In the implementation illustrated in FIG. 2, the SCM 104 on the coordinator (node 2) analyzes the cluster-level aggregated access statistics 130 and generates a smart routing table 204. As shall be described in greater detail, SCM 104 may use a clustering algorithm to group dependent connection groups (i.e. applications) together. The table below shows a typical smart routing table:

| Connection Group | Service Set |
| --- | --- |
| (SERVICE_NAME = SALES) | INST1 (GN = 0.2), INST4 (GN = 0.4), INST5 (GN = 0.4) |

-continued

| Connection Group | Service Set |
| --- | --- |
| (SERVICE_NAME = REPORTS) | INST3 (GN = 1.0) |
| (SERVICE_NAME = MARKETING) | INST2 (GN = 0.0), INST6 (GN = 1.0) |

*GN = goodness

In this example, GN stands for "goodness score". The goodness score indicates the degree of the preference to route new connections to the respective database server instance. Once a placement has been determined for a connection group, the goodness scores are generated to balance load within the service set. For example, if a service set consists of two nodes and node 1 and node 2 have 20 and 40 active sessions, respectively, then the system will assign node 2 a higher goodness score so new connections are routed to node 1. If all nodes have equal load, then the goodness score will also reflect that. The database server instance to which a connection is directed dictates the node on which the work of the session for which the connection is made will be performed.

For example, for workloads that belong to services in the connection group SALES, the node running INST4 (node 2) and the node running INST5 (node 3) are preferred over the node running INST1 (node 1). This preference is reflected by the fact that INST4 and INST5 have goodness numbers (0.4) that are greater than the goodness number for INST1 (0.2). For a given connection group, the goodness number for a given database instance may be computed using current load on the instance relative to other instances in the service set for the connection group. That is, the database server instances on nodes that are currently less busy may have higher goodness numbers than the database server instances that are on nodes that are currently busier. Consequently, goodness numbers of the nodes in a service set may change dynamically as the workloads that are being executed on the nodes in the service set change.

As illustrated by this smart routing table, services have a ranked set of nodes to determine the placement of incoming database session requests among the nodes. The rank is periodically adjusted based on (a) conflict stats and (b) load balancing criteria, to satisfy both localization and load-balancing. Eventually, the smart routing table 204 is pushed to remote listeners (e.g. listener 200) and connection pools to enable the remote listeners or connection pools to make connection routing decisions based on the smart routing table 204.

The Listener's Use of Smart Routing Tables

A "listener" is a process that receives requests from applications (e.g. from database client 202) that need to access database 150. In response to the requests, the listener 200 redirects those applications to the database server instances that will handle the requests. For example, assume that database client 202 sends a connection request to listener 200. Assume further that database client 202 is associated with service S1. The listener 200 may respond by telling the database client 202 to connect to a database server instance on node 1. The database application then connects to the specified database server instance on node 1, and sends database commands to the database server instance to have the needed work performed.

Using the techniques described herein, the listener 200 uses the routing table 204 to determine the nodes to which to direct requests based (a) the services associated with the requests, (b) the current workload configuration (which workloads are currently being executed at each node), and (c) access affinity between services (as indicated in the smart routing table 204).

Grouping Services into "Connection Groups"

In a smart routing table 204, services that have high degrees of access affinity are grouped together, thereby forming a "connection group". SCM 104 may use various techniques to form such groups based on the cluster-level access statistics 130. According to one implementation, SCM 104 uses a Hierarchical Clustering Analysis (HCA) algorithm and/or Machine Learning to create disjoint service sets. Details of Hierarchical Clustering Analysis are described at en.wikipedia.org/wiki/Hierarchical_clustering, the contents of which are incorporated hereing by this reference. Alternative implementations may use unsupervised machine learning techniques like k-means, as described at docs.oracle.com/en/database/oracle/machine-learning/om14sql/21/dmcon/clustering.html#GUID-7FB17270-54F6-4898-A4F9-319CD94B450B, the contents of which are incorporated herein by this reference. These are merely examples of algorithms that may be used to determine the clustering of services, and the access-affinity-based workload-placement techniques described herein are not limited to any particular clustering technique.

Once the members of a connection group have been determined, SCM 104 determines:
 the nodes on which the workload of the connection group should by placed (the "service set" for the connection group); and
 the goodness score for each of those nodes As illustrated above, the nodes that belong to the service set of a connection group, and their corresponding goodness scores, are identified in the row of the smart routing table 204 that is associated with the connection group. Listener 200 uses the information in that row to determine where to redirect connection requests that are associated with services that belong to the connection group.

While one implementation may use number of sessions as the "busyness metric" to rank the nodes in any given service set (where less-busy nodes have higher goodness scores than busier nodes), alternatives are possible. For example, the goodness scores may instead or in addition, take into account other busyness metrics, such as current CPU usage, current network traffic, current memory usage, current disk IO, etc.

Connection Pools Use of Smart Routing Tables

Instead of having a listener determine the workload-to-node assignments based on smart routing table 204, a client may connect to a database server instance through a connection pool. Under these circumstances, the smart routing table 204 may be provided to the connection pool entity, and the connection pool entity may make workload-to-node assignments in a manner similar to that described above with respect to listener 200.

Proactive Changes to Service-Sets

Not only can the smart routing table 204 be used to determining workload-to-node placement for new requests, the smart routing table 204 may also be used to migrate existing sessions. In one implementation, SCM 104 (the SCM of the coordinator node) continuously monitors changes in the access pattern and workload for each service. In response to workload changes, SCM 104 modifies smart routing table 204 for the active connection groups. If workload for a connection group increases, then SCM 104 may decide to "scale out" the service set of the connection group by adding additional instances to the service set of the connection group. For example, in response to an increase in the workload of the services in connection group SALES, the smart routing table 204 entry for SALES may be updated from:

| Connection Group | Service Set |
|---|---|
| (SERVICE_NAME = SALES) | INST1 (GN = 0.2), INST4 (GN = 0.4), INST5 (GN = 0.4) | to:

| Connection Group | Service Set |
|---|---|
| (SERVICE_NAME = SALES) | INST1 (GN = 0.2), INST4 (GN = 0.4), INST5 (GN = 0.4), INST6 (GN = 0.5) |

As illustrated in this example, INST6 was added to the service set for connection group SALES, thereby scaling out by spreading the work for connection group SALES among a larger set of nodes. In response to the addition of INST6, some of the current workload associated with SALES may be migrated to the node associated with INST 6.

Similarly, SCM 104 may "scale in" if the workload of a connection group decreases. For example:

| Connection Group | Service Set |
|---|---|
| (SERVICE_NAME = SALES) | INST1 (GN = 0.2), INST4 (GN = 0.4), INST5 (GN = 0.4) | may be changed to:

| Connection Group | Service Set |
|---|---|
| (SERVICE_NAME = SALES) | INST4 (GN = 0.4), INST5 (GN = 0.4) |

As a result of this scale in operation, INST1 has been removed from the service set for SALES. In response to the removal of INST1 from the service set, workload for SALES that is currenting running on the node of INST1 may be migrated to the two instances INST4 and INST5 remaining in the service set for SALES. Such migration may involve "draining" the node of INST1 of sessions that are associated with SALES. Draining may involve waiting for sessions to become stateless. Once a session becomes stateless, the session is safely terminated. Techniques for draining a node are described in detail in U.S. Patent Publication 2021/0099530, entitled "Automatic Connection Load Balancing Between Instances of a Cluster", the entire contents of which is incorporated herein by this reference.

As illustrated by these examples, the system modifies instances in the service set of an application on a need basis. When the membership of the service set of a connection group changes, cluster 100 dynamically modifies data object mastership to the instances in the current service set.

Eliminating Workload Skew

When making workload-to-node assignments based on service-level access affinity, it is possible for workload skew to occur within cluster 100. Therefore, according to one embodiment, cluster 100 executes a skew detection module that monitors whether workload skew is occurring. In response to detection that workload skew has occurred, the skew detection module may update the goodness numbers specified in the smart routing table 204 to cause more workload to be placed on the relatively less busy nodes. In addition to or instead of changing the goodness numbers to reduce workload skew, membership of the service sets may also be adjusted. For example, if the node associated with INST1 is overloaded, then INST1 may be dropped from the service set of SALES, thereby reducing the load on INST1.

Specifically, "drain directives" may be sent to the overloaded nodes. The drain directives indicate the connection group(s) of those sessions that should be drained. In response to such directives, the nodes terminate the sessions associated with the indicated session groups as soon as those sessions become stateless.

In one implementation, skew is also addressed by placing sessions associated with less-placement-restricted services (LPR services) on different nodes than those to which more-placement-restricted services (MPR services) are assigned in order to counterbalance the workloads of the MPR services. LPR services are services that scale relatively well, producing less access conflicts than MPR services. Because LPR services produce fewer conflicts, the LPR services benefit less from access-affinity-based placement. Consequently, in one embodiment, access-affinity-based placement is used for the workloads of MPR services, while the workloads of LPR services are assigned to nodes in a manner that minimizes workload skew (where little or no weight is given to access-based affinity).

For example, assume that services A, B and C are MPR services that result in significant access conflicts if not co-located, and that services D and E are LPR services produce few access conflicts regardless of where located. Under these conditions, the system may use access-based-affinity to place the workload of services A, B and C on nodes 1 and 2, and skew-minimizing techniques to place the workload of services D and E on nodes other than nodes 1 and 2. In this scenario, LPR services D and E may not even be assigned to a connection group in smart routing table 204 if their access-affinity to other services is not a factor in the placement of their respective workloads.

Proactive Cache Warmup

As mentioned above, SCM 104 (the SCM on coordinator node 2) may modify smart routing table 204 dynamically in response to workload changes. The modifications may change the nodes specified in the service sets for one or more of the connection groups. These modifications could result in new instances being added to the service set of a connection group. A newly added instance does not have data blocks in the buffer cache relevant to the corresponding application (the services in the connection group). Therefore, such a transition would result in reduced performance until the buffer cache of the newly-added node is filled/warmed up.

In one implementation, this reduced performance period is minimized or avoided by reading data blocks from the disk and proactively "warming up" the cache as new instances are added in the service set for an application. In one implementation, the buffer cache is divided in proportion to the workload between the applications (smart connection groups). An application with higher cache activity will be allocated more cache. The SCM on the newly added instance sends a request to "warm up" its cache. In response to the warm up request, an extent map for the mostly accessed data objects of the connection group is read, and the data blocks for those mostly accessed data objects are pre-loaded into the cache of the newly added instance.

Collecting Sub-Object Statistics

If there are enough access conflicts for a particular data object, then the coordinator node dynamically updates all nodes in the cluster to record access conflicts for sub-parts of the object. In that case, the coordinator node will divide data object address space into fixed number of slots. For example, instead of treating object X as a single object for the purpose of access statistics, object X may be divided up into four "slots": X1, X2, X3, and X4. Each slot has starting block address (start_dba) and ending block address (end_dba) associated with it.

Once a database object has been divided into slots, the database system aggregates conflict information on a per-slot/per-service-pair basis, rather than on a per-database-object/per-service-pair basis. Thus, for a slot that associated with the address range [start_dba, end_dba], the aggregated access statistics would contain aggregate access conflict statistics between each pair of services for any data blocks whose address falls in the [start_dba, end_dba] range. Over time, the coordinator node could periodically update slot boundaries based on which portions of a database object are experiencing greater or fewer inter-service block access conflicts.

Intra-Service Interactions

Intra-service interactions are interactions that occur between processes that belong to the same service. In one implementation, the techniques described above for capturing inter-service data access affinities are extended to also capture intra-service data access affinities. Specifically, the sessions associated with a service are divided into distinct groups. Access records 104 are then generated not only for interactions between distinct services, but for interactions between distinct groups of the same service.

For example, assume that four groups G1, G2, G3 and G3 are established for service X. Assume further that process P1 and process P3 are both executing work for service X, but the session associated with process P1 is assigned group G1, and the session associated with process P3 is assigned group G2. Under these circumstances, if P1 requests an exclusive lock on a data block B1 on which P3 currently hold an exclusive lock, an access record may be generated with the following information:

data block metadata=B1
current-accessing service=service X/G1
prior-accessing service=service X/G2.
interaction-type identifier=write/write conflict
inter-node conflict flag=false In one implementation, the system assigns each session a group when it is created. In the example given above, one session of service X is assigned group G1, and another session of the service X is assigned group G2. The system records a data access conflict when a data block is accessed by a session with different (group_id, service_id) than the (group_id, service_id) of the session that last modified the data block. For each data block update, the system will store the group and service id of the updating session to a buffer header. The system also records a conflict if a data block is pinged after update.

Based on the intra-service conflicts that are recorded in this manner, the system is able to estimate how scalable a service is. Specifically, a service with a high degree of intra-service conflict is less scalable, since spreading the workload of the service over multiple nodes may significantly increase access conflicts, thereby degrading performance of the service. On the other hand, a service will a low degree of intra-service conflict is more scalable, since spreading the workload over multiple nodes will result in minimal performance degradation. The system uses the relative scalability of each service, determined in this manner, as a factor used to determine the number of nodes to which to direct the workload of each service.

The scalability of connection groups may be determined in a similar fashion, where different sessions within a connection group are assigned to distinct groups for the purpose of determining intra-connection-group conflicts. The number of instances that are included in the service set of any connection group may be determined, at least in part, based on the scalability of the connection group. In one implementation, a connection group may include multiple services, and the sessions within a "connection group" are grouped based on the associated service. In such an implementation, intra-connection-group conflicts need not be computed separately, as these are same as inter-service conflicts within that group. If a connection group has only one service, its intra-connection-group conflicts may be determined by assigning its sessions to distinct groups, as described above.

Affinity Changes Over Time

Affinity between services can change over time as applications and their workload change. In one implementation, the server continuously monitors data accesses in the system and checks for significant changes in the workload at each time interval. Further, users can start and stop services that can change connection groups. The system recomputes connection groups and routing tables in response to these changes. When regenerating connection groups and routing tables, current placement is considered to minimize session migrations and interruptions to the applications.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability. Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   within a cluster that comprises a plurality of nodes, executing a plurality of database server instances that have access to a shared database;
   wherein the shared database includes a plurality of database objects;
   wherein data for the plurality of database objects are stored on a plurality of data blocks; within the cluster, executing a plurality of sessions, wherein each session of the plurality of sessions:
      is associated with a respective service of a plurality of services, and
      interacts with a database server instance, of the plurality of database server instances, to access one or more database objects of the plurality of database objects;
   generating access records that indicate when sessions that are associated with each service, of the plurality of services, perform access operations on data blocks, of the plurality of data blocks, that were accessed by another session that is associated with another service, of the plurality of services;
   generating access affinity information based on the access records, wherein the access affinity information indicates access affinity between each service of the plurality of services and each other service of the plurality of services; and
   selecting on which node, of the plurality of nodes, to perform work for a particular session based, at least in part, on:
      a particular service associated with the particular session, and
      access affinity, indicated by the access affinity information, between the particular service and other services of the plurality of services;
   wherein the method is performed by one or more computing devices.

2. The method of claim 1 further comprising:
   based on the access affinity information, generating a smart routing table;
   wherein the smart routing table indicates, for each service of the plurality of services, a subset of nodes, of the plurality of nodes, to which sessions associated with the service should be assigned; and
   wherein the node that is selected to perform the work for the particular session is selected from the subset of nodes, specified in the smart routing table, for the particular service.

3. The method of claim 2 further comprising:
   dynamically updating the access affinity information based on changes in workload within the cluster; and
   dynamically updating the smart routing table based on updates to the access affinity information.

4. The method of claim 2 wherein:
   for each node in the subset of nodes specified for the particular service in the smart routing table, the routing table includes a goodness number; and
   the goodness number associated with each node in the subset of nodes indicates a relative preference for selecting that node for sessions associated with the particular service.

5. The method of claim 1 wherein the access records include one or more access records that indicate:
   a pair of services that interacted with a given data block, and
   a type of interaction between the services relative to the given data block.

6. The method of claim 5 wherein the type of interaction indicates a type of lock conflict that occurred when a current-accessing service attempted to perform an operation on a data block on which a prior-accessing service had performed an operation.

7. The method of claim 5 wherein the type of interaction indicates a recent-update interaction.

8. The method of claim 5 wherein the one or more access records further include an indication of whether interaction between sessions of the pair of services, relative to the data block, was inter-node or intra-node.

9. The method of claim 1 wherein:
   generating the access affinity information includes, for each database object of the plurality of database objects, generating a conflict score between each service pair of the plurality of services;
   wherein the conflict score between a given service pair for a given database object indicates a degree to which services in the service pair are competing for access to data blocks that belong to the given database object.

10. The method of claim 9 wherein, when generating conflict scores, different types of interactions are given different weights.

11. The method of claim 2 further comprising:
based on the access affinity information, grouping the plurality of services into connection groups, wherein services that belong to a connection group have high access affinity to each other service in the connection group; and
wherein the smart routing table specifies, for each connection group, a service set; wherein the service set associated with each connection group specifies the subset of nodes to which work from the sessions of services that belong to the connection group may be placed.

12. The method of claim 11 wherein a hierarchical clustering analysis algorithm is used for grouping the plurality of services into connection groups.

13. The method of claim 11 further comprising:
dynamically changing the access affinity information in response to changes in workload within the cluster; and
based on dynamic changes in the access affinity information, adding or removing a node to the service set of a connection group.

14. The method of claim 13 wherein:
a given node is added to the service set of a given connection group based on the dynamic changes in the access affinity information;
the method further comprises warming up a cache of the given node by preloading the cache with copies of a set of data blocks that are frequently accessed by services in the given connection group.

15. The method of claim 1 further comprising:
assigning sessions associated with the particular service to one of a plurality of session groups;
wherein generating access records includes generating intra-service access records that indicate when sessions that are assigned to one session group of the particular service perform access operations on data blocks that were accessed by another session that is associated with another session group of the particular service;
based on the intra-service access records, determining a degree of scalability of the particular service; and
based, at least in part, on the degree of scalability of the particular service, determining a number of nodes, within the cluster, to which to assign sessions of the particular service.

16. The method of claim 11 further comprising:
dynamically changing the access affinity information in response to changes in workload within the cluster; and
based on dynamic changes in the access affinity information, changing goodness numbers of nodes within the services set of a connection group;
wherein the goodness numbers indicate relative preference for workload placement among the nodes of the connection group.

17. The method of claim 1 further comprising:
based on the access affinity information, dividing the plurality of services into:
a set of less-placement-restricted services, and
a set of more-placement-restricted services;
wherein the particular service belongs to the set of more-placement-restricted services; and
the method further comprises assigning sessions associated with the less-placement-restricted services to nodes to avoid skew that would otherwise be caused by placement of sessions of the more-placement-restricted services.

18. The method of claim 1 further comprising:
dividing a database object of the shared database into a plurality of sub-objects; and wherein access affinity information includes, for each sub-object of the plurality of sub-objects, conflict scores for service pairs.

19. One or more non-transitory computer-readable media storing instructions which, when executed by one or more computing devices, cause:
within a cluster that comprises a plurality of nodes, executing a plurality of database server instances that have access to a shared database;
wherein the shared database includes a plurality of database objects;
wherein data for the plurality of database objects are stored on a plurality of data blocks; within the cluster, executing a plurality of sessions, wherein each session of the plurality of sessions:
is associated with a respective service of a plurality of services, and
interacts with a database server instance, of the plurality of database server instances, to access one or more database objects of the plurality of database objects;
generating access records that indicate when sessions that are associated with each service, of the plurality of services, perform access operations on data blocks, of the plurality of data blocks, that were accessed by another session that is associated with another service, of the plurality of services;
generating access affinity information based on the access records, wherein the access affinity information indicates access affinity between each service of the plurality of services and each other service of the plurality of services; and
selecting on which node, of the plurality of nodes, to perform work for a particular session based, at least in part, on:
a particular service associated with the particular session, and
access affinity, indicated by the access affinity information, between the particular service and other services of the plurality of services.

20. The one or more non-transitory computer-readable media of claim 19 wherein the instructions comprise instructions for:
based on the access affinity information, generating a smart routing table;
wherein the smart routing table indicates, for each service of the plurality of services, a subset of nodes, of the plurality of nodes, to which sessions associated with the service should be assigned; and
wherein the node that is selected to perform the work for the particular session is selected from the subset of nodes, specified in the smart routing table, for the particular service.

21. The one or more non-transitory computer-readable media of claim 19 wherein the instructions comprise instructions for:
assigning sessions associated with the particular service to one of a plurality of session groups;
wherein generating access records includes generating intra-service access records that indicate when sessions that are assigned to one session group of the particular service perform access operations on data blocks that were accessed by another session that is associated with another session group of the particular service;
based on the intra-service access records, determining a degree of scalability of the particular service; and based, at least in part, on the degree of scalability of the particular service, determining a number of nodes, within the cluster, to which to assign sessions of the particular service.

\* \* \* \* \*